Patented Aug. 31, 1954

2,688,029

UNITED STATES PATENT OFFICE 2,688,029

METHOD OF PREPARING STEROID COMPOUNDS

Seymour Bernstein, Pearl River, and Milton D. Heller, Monsey, N. Y., assignors to American Cyanamid Company, New York, N. Y., a corporation of Maine No Drawing. Application April 3, 1952, Serial No. 280,381

3 Claims. (Cl. 260—397.2)

This invention relates to a method of preparing steroid compounds. More particularly, it relates to a method of preparing $\Delta^{4,7,22}$-ergostatriene-3-one and $\Delta^{4,7,9(11),22}$-ergostatetraene-3-one.

The corticoid hormone field has been greatly stimulated by the results obtained through the use of cortisone and related compounds. Many different methods have been described for the preparation of cortisone from various starting materials such as bile acids, diosgenin, ergosterol and even by total synthesis. The compounds of the present invention are particularly useful in that they may be prepared from the relatively abundant source material ergosterone and also because of the fact that the ergosterol side chain in the 17-position may be converted into a side chain identical with that possessed by cortisone.

The compounds of the present invention are prepared by reacting a lower alkanoic acid ester of $\Delta^{3,5,7,22}$-ergostatetraene-3-ol or $\Delta^{3,5,7,9(11),22}$-ergostapentaene-3-ol with an alkali metal alkoxide in the presence of a solvent. The solvent may be an organic solvent such as benzene, methanol, ethanol, propanol, etc. The reaction is preferably carried out under anhydrous conditions by first dissolving the starting material in a solvent or mixture of solvents and adding thereto the alkali metal alkoxide also dissolved in a solvent.

We prefer to carry out the process of the present invention at room temperature, however, the temperature may vary from about 10° C. to about 100° C. At these temperatures the reaction is usually completed within a period of from ten minutes to about two hours.

The intermediates used in the process of the present invention are known compounds, the preparation of which has been described in the chemical literature.

After the reaction is complete the product may be recovered by acidifying the reaction mixture and removing the solvent under reduced pressure. The reaction product is then slurried in water and may be recovered by filtration or extracted with an organic solvent such as diethyl ether. The product can then be further purified by recrystallization from an organic solvent such as acetone. The products obtained are solids having definite melting points.

The process of the present invention will now be described in greater detail in the following examples.

Example 1

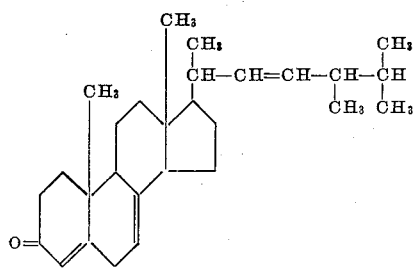

To a solution of 0.5 g. of $\Delta^{3,5,7,22}$-3-acetoxyergotatetraene in 15 ml. of absolute methanol and 10 ml. of reagent benzene placed under nitrogen was added 0.08 g. of sodium methoxide dissolved in 10 ml. of anhydrous methanol. After standing at room temperature for twenty minutes, the dark red solution was acidified with a few drops of acetic acid and the solvents were removed under reduced pressure. Water was added and the resultant yellow precipitate filtered off. Several recrystallizations from acetone gave pure $\Delta^{4,7,22}$-ergostatrienone-3, melting point 132°–133° C., $\lambda^{\text{absolute-alcohol maximum}}$ 238–239 m$\mu$.

Example 2

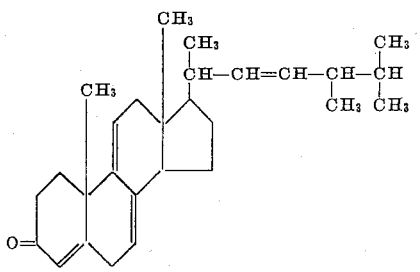

A solution of 0.55 g. of $\Delta^{3,5,7,9(11),22}$-3-acetoxyergostapentaene in 15 ml. of reagent benzene and 22 ml. of anhydrous methanol under nitrogen was treated with a solution of 0.100 g. of sodium methoxide in 10 ml. of absolute methanol. After twenty minutes, the dark red solution was acidified with several drops of acetic acid and the solvents removed under reduced pressure. Water was added and the mixture extracted three times with ether. The combined ether extracts were washed with dilute sodium bicarbonate, treated with activated charcoal and dried over magnesium sulfate. Removal of the ether under reduced pressure left a yellow solid. Several recrystallizations from acetone at the temperature of a Dry Ice-acetone bath gave pure $\Delta^{4,7,9(11),22}$-ergostatetraene-3-one, melting point 136°–138° C.; $\lambda^{\text{absolute-alcohol maximum}}$ 235.5–236.5; 242; 249.5–250.5 m$\mu$.

We claim:

1. A method of preparing $\Delta^{4,7,9(11),22}$-ergostatetraene-3-one which comprises reacting a lower alkanoic acid ester of $\Delta^{3,5,7,9(11),22}$-ergostapentaene-3-ol with an alkali metal alkoxide in the presence of a solvent under anhydrous conditions.

2. A method of preparing $\Delta^{4,7,9(11),22}$-ergostatetraene-3-one which comprises reacting $\Delta^{3,5,7,9(11),22}$-3-acetoxyergostapentaene with sodium methoxide in a hydrocarbon-alcohol solvent under anhydrous conditions.

3. A method of preparing $\Delta^{4,7,9(11),22}$-ergostatetraene-3-one which comprises reacting $\Delta^{3,5,7,9(11),22}$-acetoxyergostapentaene with sodium methoxide in a benzene-methanol solvent under anhydrous conditions.

References Cited in the file of this patent

UNITED STATES PATENTS

| Number | Name | Date |
| --- | --- | --- |
| 2,411,177 | Wintersteiner | Nov. 19, 1946 |
| 2,601,287 | Heyl | June 24, 1952 |

OTHER REFERENCES

Groggins: Unit Processes in Organic Synthesis," 1947, pp. 635–9.

Fieser and Fieser: "Natural Products Related to Phenanthrene," 3d, ed., 1949, pp. 186–190.